United States Patent [19]
Northcott

[11] Patent Number: 5,310,285
[45] Date of Patent: May 10, 1994

[54] DEVICE FOR RECLAIMING AND DISPOSAL OF DRILLING WASTES AND METHOD OF USE THEREFORE

[76] Inventor: T. J. Northcott, 225 E. Fireweed La., Suite 203, Anchorage, Ak. 99503

[21] Appl. No.: 62,823

[22] Filed: May 14, 1993

[51] Int. Cl.⁵ .......................... B09B 3/00; B09B 5/00; E21B 21/06
[52] U.S. Cl. .................. 588/250; 166/305.1; 175/66; 405/128
[58] Field of Search .................. 405/128, 129, 53, 59; 588/249, 250; 175/66, 206; 166/305.1, 308

[56] References Cited

U.S. PATENT DOCUMENTS

| | | | |
|---|---|---|---|
| 4,480,702 | 11/1984 | Kelly | 175/206 X |
| 4,747,961 | 5/1988 | Beer et al. | 175/206 X |
| 4,942,929 | 7/1990 | Malachosky et al. | 405/128 X |
| 5,109,933 | 5/1992 | Jackson | 175/66 |
| 5,129,469 | 7/1992 | Jackson | 405/128 X |
| 5,207,532 | 5/1993 | Mason et al. | 405/128 |
| 5,213,446 | 5/1993 | Dovan | 405/128 |
| 5,226,749 | 7/1993 | Perkins | 175/66 X |

Primary Examiner—Dennis L. Taylor
Attorney, Agent, or Firm—Michael J. Tavella

[57] ABSTRACT

The new method of removal and disposal of frozen reserve pit material, thawed reserve pit material and soils contaminated with low level radiation or other pollutants is disclosed. The system has several components that take the solids material and to crush the material down to a workable size. The crushed mixture is agitated and mixed into a slurry. Unlike other systems, the present invention uses agitation plus a jet feed of the fines slurry that is pumped into the bottom of the holding tanks. This supplemental feed assures proper dilution and ensures through mixing. The system then uses finer crushers and hydrocyclones to reduce the particulate size further. Once the material is properly reduced, it can be pumped into an injection well for disposal below ground, using any suitable method.

18 Claims, 4 Drawing Sheets

DEVICE FOR RECLAIMING AND DISPOSAL OF DRILLING WASTES AND METHOD OF USE THEREFORE

This invention relates to systems and methods for disposing of waste fluids and solids and more particularly to such systems and methods for reclaiming drill tailings stored in pits.

BACKGROUND OF THE INVENTION

Oil and gas drilling operations produce drill cuttings or "tailings" that consist of material removed from a well with mixtures of other fluids and materials that are used to facilitate drilling. This other material is typically called drilling mud. In the past, the tailings and spent mud were pumped to open surface pits for storage. Current environmental rules regulate handling and disposal of the tailings that prohibit their disposal on the surface. To solve this problem, several methods of disposal have been developed. Recent examples may be found in U.S. Pat. No. 4,942,929 to Malachosky et al. and U.S. Pat. No. 5,109,933 to Jackson. The Malachosky et al. patent teaches a method for cleaning and removing commercial quantities of gravel that are recovered from wells drilled in northern Alaska. The method calls for making a slurry of the remaining material and then reinjecting this material back into the ground. The Jackson Patent uses centrifugal pumps to grind solids recovered from offshore wells. The ground solids are then mixed into a slurry and reinjected into the well for disposal. Both inventions are designed for specific, narrowly designed purposes. They are not designed to treat large quantities of solid materials that may be frozen, such as material stored in many above-ground reserve pits found in the polar regions. Moreover, these devices cannot dispose of large quantities of material.

BRIEF DESCRIPTION OF THE INVENTION

The present invention provides a method of removal and disposal of this general type of solid waste material. The present invention is designed to dispose of frozen reserve pit material, thawed reserve pit material and soils contaminated with low level radiation or other pollutants.

The system consists of several components. The general concept is to take the solids material and to crush the material down to a workable size. The crushed mixture is then agitated and mixed into a slurry. Unlike other systems, the present invention uses agitation plus a jet feed of the fines slurry that is pumped into the bottom of the various holding tanks. This supplemental feed assures proper dilution and ensures through mixing. The system uses finer crushers and hydrocyclones to reduce the particulate size further. The system is designed and engineered for a turbulent flow in all lines.

Once the material is properly reduced, it can be pumped into an injection well for disposal below ground, using any suitable method. The amount of reduction of particulates saves pumps. Large particles being fed through centrifugal pumps will quickly destroy impellers. For example, the method taught by Jackson will result in pump replacement in one or two months of operation. The present method can extend pump life five to six times.

A typical use for the system is in the disposal of frozen tailings. First, frozen material is dug out of the reserve pit and ran through a crusher. This produces material that is screened down to two inches or less. Larger pieces are returned to the crusher and rescreened. The screened material is then dumped into a slurry tank, where heat is injected to thaw the material. Fine slurry material from upstream is also pumped in to liquefy this material and to form a thick slurry. This material is agitated to prevent the solids from caking or settling to the bottom and to ensure thorough thawing. The material is then fed through a shaker. Oversized pieces are fed through a second crusher and returned for rescreening. Screened material is fed to a holding tank where it is agitated. The material is then pumped into a hydrocyclone. The output of the hydrocyclone is classified as solids or liquids. Liquids are fed to a second holding tank. The overflow from this tank is dumped into a preinjection holding tank. Solids coming from the hydrocyclone are fed to a third classifying shaker. Oversize material from this shaker is passed through a third crusher for further processing. Output of this crusher is then fed into the slurry tank for reclassification. Fines and fluids from the third classifying shaker are fed directly to the preinjection holding tank. The material here is then maintained in a slurry until it is pumped through an injection pump to either an injection well or to a storage tank for later disposal.

For larger volumes, an additional hydrocyclone can be introduced into the system before the first classifying shaker. Here, the solids from the hydrocyclone are pumped to the first classifier and the fluids are returned to the slurry tank.

The same system can be used to dispose of thawed material or any other contaminated material. The process is essentially the same.

It is an object of this invention to produce a system for the disposal of contaminated waste soils by successively reducing particulate size to form a slurry that does not damage pump components.

It is another object of this invention to produce a system for the disposal of contaminated waste soils that can dispose of many materials without having to reconfigure or modify the system components.

It is yet another object of this invention to produce a system for the disposal of contaminated waste soils that is relatively compact for shipment to remote sites for use.

DETAILED DESCRIPTION OF THE INVENTION

Figure 1:
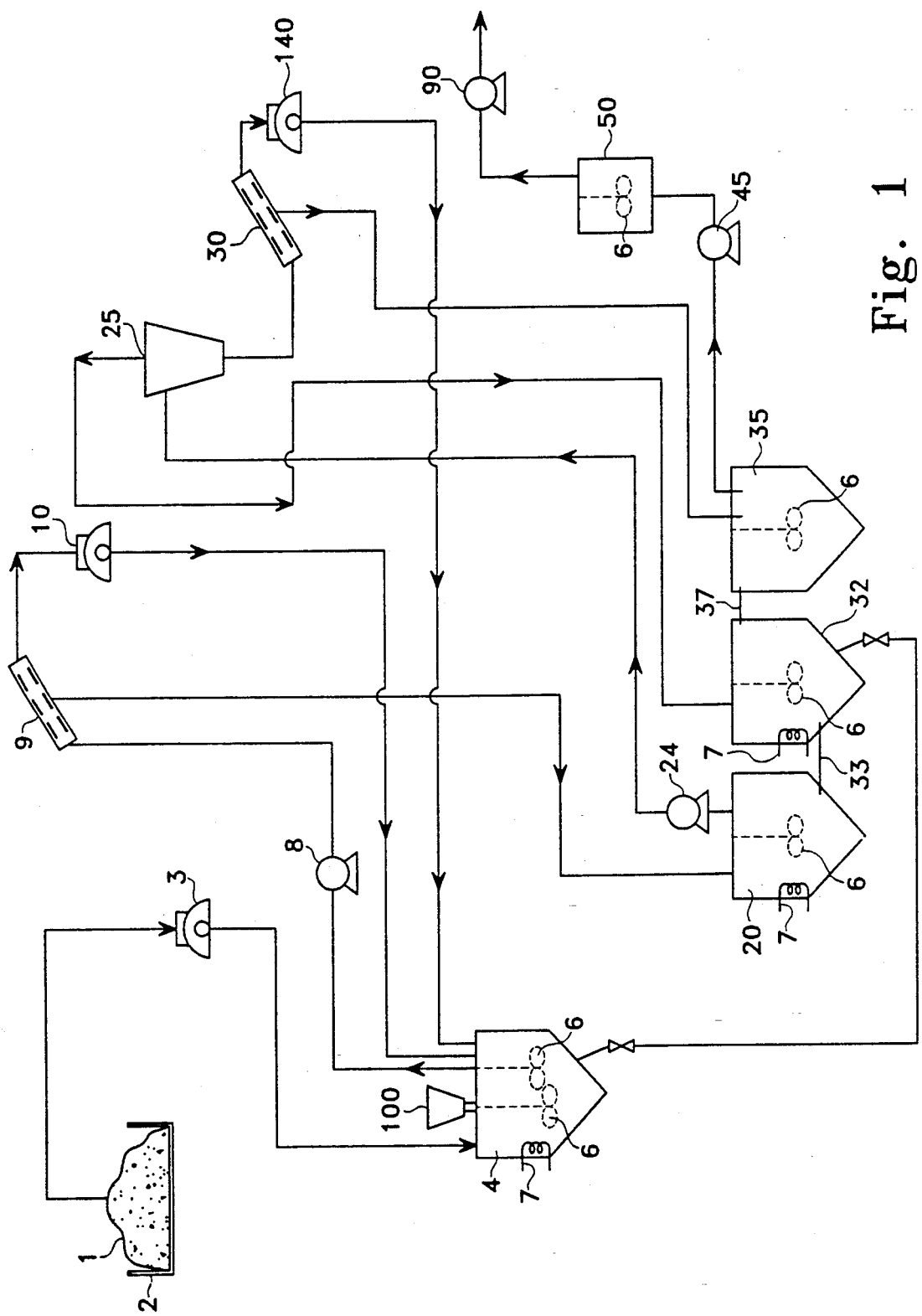
FIG. 1 is a schematic representation of the major system components and the material flows between them.

In the description that follows, and in the drawings, certain features and elements that are commercially available or are of conventional construction are described only in general terms and are shown in schematic form in the interest of clarity and conciseness.

Referring now to the drawings, waste materials 1 are held in a reserve pit 2. These materials include gravels, soils and clays removed from a well drilling operation or may consist of contaminated soils that are trucked into an area for disposal. In a well drilling operation, the mixture will also contains components of drilling mud, a composite material used to help the drilling process. In the drilling operation this material has been typically dumped into the reserve pits 2, that are dug into the ground nearby the well site. These pits 2 are typically open and exposed to the elements. Some materials placed in these pits 2 are now considered to be hazardous wastes, requiring special handling, or below-surface disposal. One problem encountered is that this material is viscous and often forms large clumps, making pumping and, therefore, down hole disposal, difficult. Moreover, in northern climate zones, such as Alaska, these pits become frozen in the winter making treatment and disposal even more difficult.

To remove frozen material from the pit 2, in the preferred embodiment, chippers are used to break out the material in chunks. Alternatively, the material may be thawed using steam or a limited amount of hot water, which can be injected directly into the reserve pit 2.

This material is then passed through a primary crusher 3 and dumped in a slurry tank 4. The output of the crusher is fed into the slurry tank 4 using a method called dispersed feed, which breaks the material into approximately 2 inch minus chunks. These chunks are then kept separated and are coated with a thin layer of fluid. This acts to keep the chunks apart. If the dispersed feed method is not used, the chunks will quickly congeal into larger and larger masses that will jam the operation of the slurry tank.

To dilute the material that is pumped into this pit, upstream slurry is pumped through equalizer lines 5 into the slurry tank 4. Two agitators 6 are provided to help break up any clumps as the material thaws and to keep the solids from settling to the bottom. Thawing is aided by the injection of heat through a heat source 7 as needed. A hopper 100 is provided to permit the additional of chemical agents, such as bentonite, to ensure a workable mixture.

Figure 3:
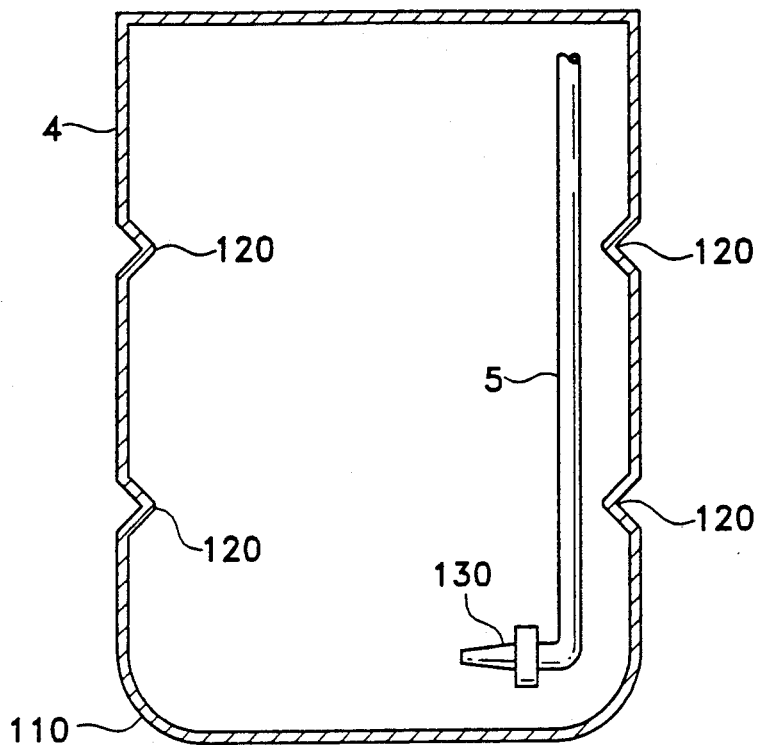
FIG. 3 is cross sectional view of the slurry tank.
Figure 4:
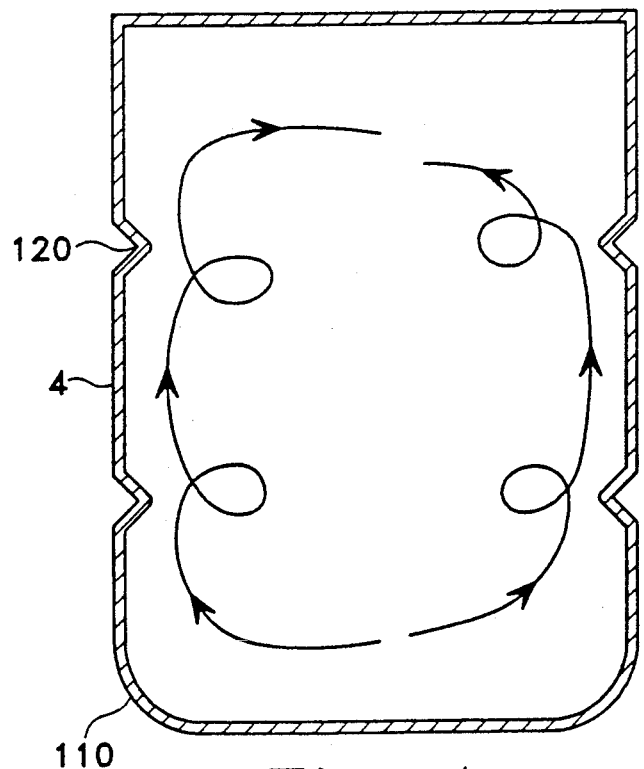
FIG. 4 is cross sectional view of the slurry tank showing the turbulent action within the tank.

Referring now to FIG. 3, the slurry tank 4 has a unique design to ensure maximum mixing and minimum settlement. The Tank 4 has a curved bottom 110 and indentations 120 formed into the sides of the tank as shown. The indentations 120 cause turbulence within the drum to help mix the slurry more thoroughly. This turbulence is suggested by the curved lines in FIG. 4.

A jet spray 130 is provided in the slurry tank 4. The jet spray is used to spray thinned slurry from equalizer line 5 into the bottom of the slurry tank, to add liquid, and to keep solids off the bottom of the tank.

In FIG. 1, the thawed material, now in a thick slurry, is pumped by a DISCFLO type pump 8, manufactured by DISCFLO Corporation, Santee, Calif. 92071. The discharge from pump 8 is then fed through a screen shaker 9 for classification. The shaker 9 passes chunks of 4 to 50 mesh or smaller. Larger pieces are fed to a secondary crusher 10. The output of the secondary crusher is then fed back to the slurry tank 4.

The 4-50 mesh material that is passed by the shaker 9 is then fed into a first holding tank 20 where it is agitated. This material in holding tank 20 is pumped, via pump 24 into a hydrocyclone 25. The hydrocyclone 25 is designed for a minimum volume rate of 1.5 times the volume output of pump 8. The output of the hydrocyclone 25 is classified as solids or liquid. The liquids are withdrawn from the top of the hydrocyclone 25 and fed from the hydrocyclone into a second holding pit 32 that is also agitated. The slurry in this tank, as discussed above, is fed back into the slurry tank 4 to create the initial slurry. Tank 20 has a bottom equalization line 33 connected to tank 32.

Solids from the hydrocyclone 25 are fed through a second shaker 30. The passed material through this shaker is fed into a third holding tank 35. This tank is the final processing tank. Oversize from the shaker 30 is passed through a third crusher 140. Output of this crusher is fed into the slurry tank 4. Material from holding tank 32 is passed into the final stage tank 35 by a top end equalizer line 37.

Figure 2:
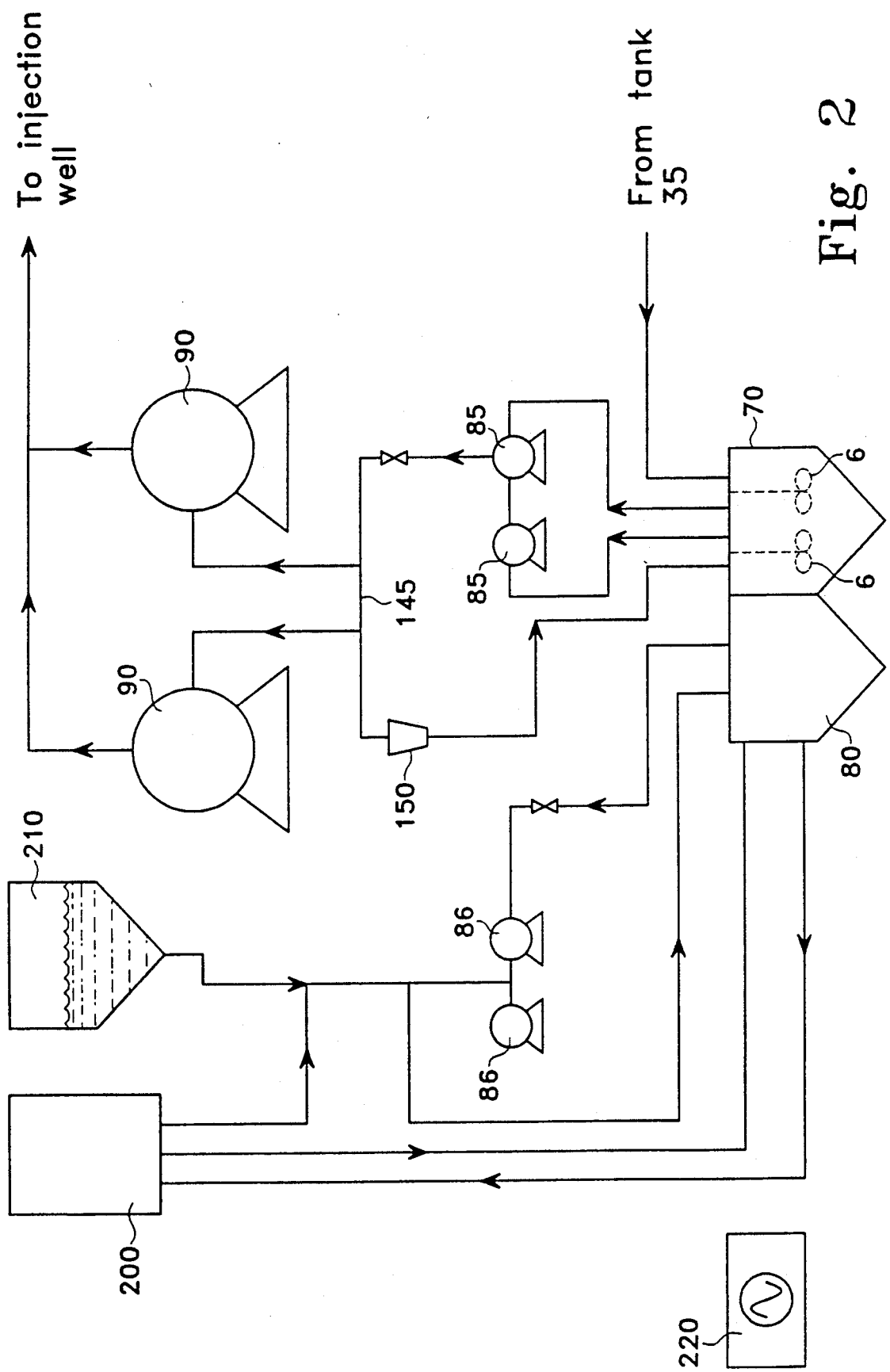
FIG. 2 is a detailed schematic of the injection system components.

The slurry in the final stage tank 35 is pumped, using a common 5×6 pump 45, also known as a straight volute pump, to the injection processing unit 50 for later disposal. FIG. 2 shows details of this portion of the system. The slurry is transported to an injection tank 70 that is double agitated. Material is pumped from this tank by a 5×6 pump 85. The figure shows a pair of pumps, only one of which is used at a time. The other pump is a spare. This material is then pumped into a manifold line 145. The manifold line feeds the injector pumps 90. The injector pumps are standard piston fluid enclosed high pressure mud pumps or cementing pumps common to the industry. A reducer 150 is placed at the return end of the manifold 145. In the preferred embodiment, the reducer reduces a 6 inch manifold down to a 4 inch return line. This reduction creates a back pressure to keep the injection pumps 90 primed and increases velocity in the lines to keep the solids from settling. The output of the injection pumps 90 is then fed to the well for injection by ordinary means known in the art.

FIG. 2 also shows some other components needed for the system. A boiler 200 is provided to heat a water supply for steam and for washdown water for the shakers. A water tank 80 is also provided. The water tank is used with pumps 86 to provide an alternative feed for the injection pumps in case the well begins to pressurize or other problems arise or if the slurry supply is disrupted. This water is used to keep solids from settling in the well. A main water tank 210 is provided for bulk storage. Finally, an electric generator 220 may be also used if the site lacks commercial power.

Figure 5:
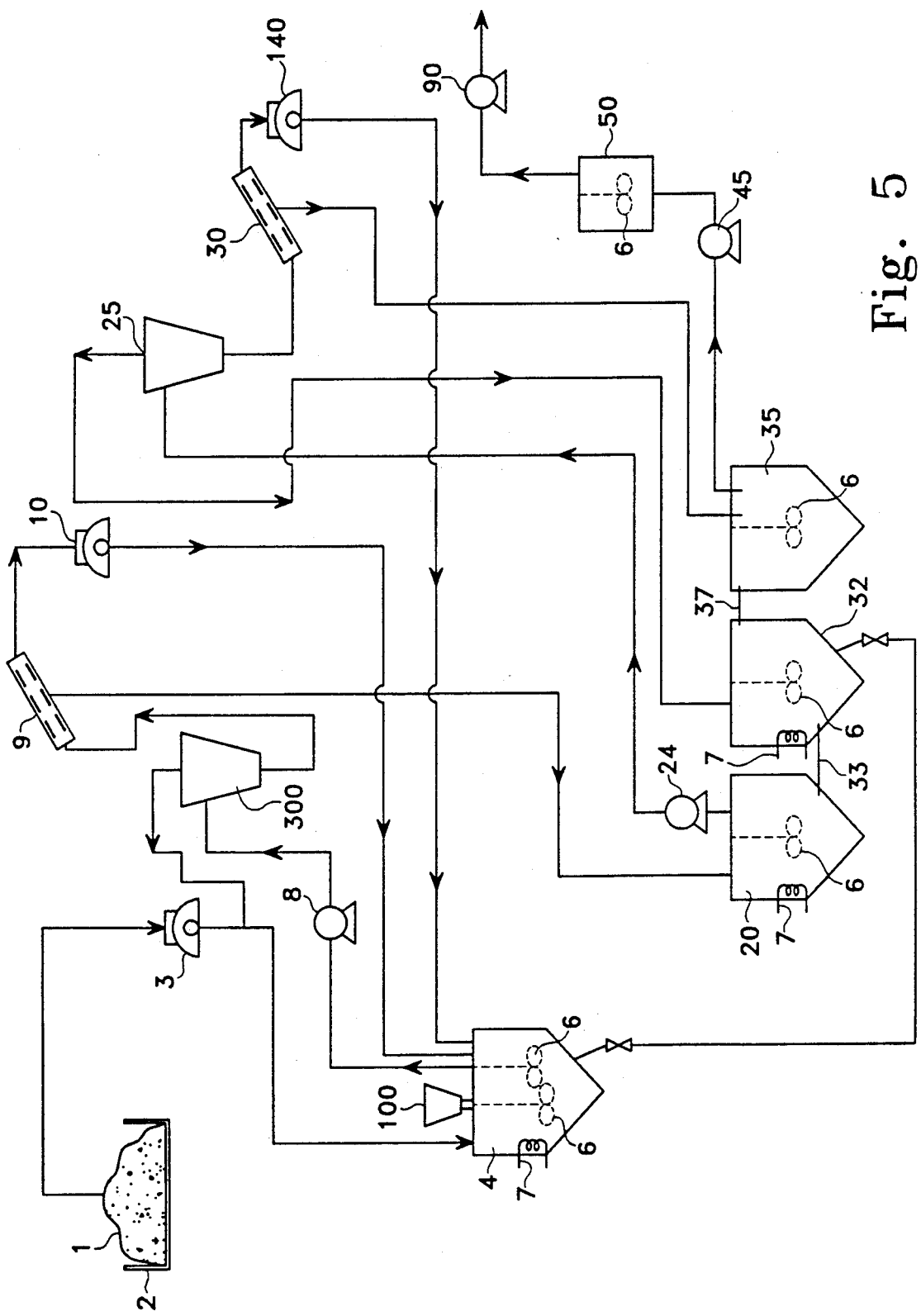
FIG. 5 is a schematic of a second embodiment of the invention.

Referring now to FIG. 5, for high volume throughput, an additional hydrocyclone 300 may be added. In this embodiment, the output of pump 8 feeds into the top of hydrocyclone 300. The fluids from hydrocyclone 300 are fed back to slurry tank 4. The solids are extracted and passed to classifying shaker 9. where, the process follows the original process as discussed above. The second hydrocyclone is used in high volumes because it is critical to the operation of this system that the slurry is kept moving and agitated to prevent solids from settling under high volume conditions. This process depends on keeping the slurry active to prevent settling.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A method of processing reserve pit material for injection into a disposal well comprising the steps of:
   a) passing chunks of reserve pit material through a primary crusher;
   b) mixing the output material of the crusher with fluid to form a viscous slurry material in a slurry mixing tank;
   c) transferring said slurry to a first classification shaker;
   d) passing the output of the first classification shaker to a first holding tank;
   e) passing the material in the first holding tank to a hydrocyclone;
   f) removing the liquids produced from the hydrocyclone and passing them to a second holding tank;
   g) removing the solids from the hydrocyclone and passing them through a secondary classification shaker;
   h) passing the undersized material from the secondary shaker to the third holding tank;
   l) passing the slurry material from the second holding tank into a well injection system for injection into a disposal well.

2. The method of claim 1 wherein said step of passing the slurry material from the final processing tank into a well injection system for injection into a disposal well comprises the steps of:
   a) passing the slurry material into an injection tank;
   b) passing the slurry material from said injection tank under pressure to an injection pump manifold;
   c) forcing said slurry mixture through an injection pump;
   d) forcing said mixture into an injection well.

3. The process of claim 1 wherein the step of mixing the output material of the crusher with fluid to form a viscous slurry material further comprises;
   a) forcing a portion of the slurry mixture held in the second holding tank back into slurry mixing tank to promote additional mixing.

4. The process of claim 1 wherein said slurry mixture is forced by means of pumps.

5. The process of claim 1 further comprising the step of:
   a) injecting heat in said slurry mixing tank to promote thawing of frozen material.

6. The process of claim 1 wherein said viscous slurry held in said slurry mixing tank is pumped from said tank by means of a DISCFLO type pump.

7. A method of processing reserve pit material for injection into a disposal well comprising the steps of:
   a) passing chunks of reserve pit material through a primary crusher;
   b) mixing the output material of the crusher with fluid to form a viscous slurry material in a slurry mixing tank;
   c) transferring said slurry to a primary shaker for classification;
   d) passing the oversize material from the primary shaker to a secondary crusher;
   e) passing the output of the secondary crusher back to the slurry mixing tank for further processing;
   f) passing the undersized material to a first holding tank;
   g) passing the material from the first holding tank to a hydrocyclone;
   h) removing the liquids produced from the hydrocyclone and passing them to a second holding tank;
   g) removing the solids from the hydrocyclone and passing them through a secondary shaker;
   h) transferring the liquids from the second holding tank into a final processing tank;
   i) passing the undersized material from the secondary shaker to the final processing tank;
   j) passing the oversize material from the secondary shaker through a tertiary crusher;
   k) passing the material from the tertiary crusher into the second holding tank for further processing; and
   l) passing the slurry material from the final processing tank into a well injection system for injection into a disposal well.

8. The method of claim 7 wherein said step of passing the slurry material from the final processing tank into a well injection system for injection into a disposal well comprises the steps of:
   a) passing the slurry material into an injection tank;
   b) passing the slurry material from said injection tank under pressure to an injection pump manifold;
   c) forcing said slurry mixture through an injection pump;
   d) forcing said mixture into an injection well.

9. The process of claim 7 wherein the step of mixing the output material of the crusher with fluid to form a viscous slurry material further comprises:
   a) forcing a portion of the slurry mixture held in the second holding tank back into slurry mixing tank to promote additional mixing.

10. The process of claim 7 wherein said slurry mixture is forced by means of pumps.

11. The process of claim 7 further comprising the step of:
    a) injecting heat in said slurry mixing tank to promote thawing of frozen material.

12. The process of claim 7 wherein said viscous slurry held in said slurry mixing tank is pumped from said tank by means of a DISCFLO type pump.

13. A method of processing reserve pit material for injection into a disposal well comprising the steps of:
    a) passing chunks of reserve pit material through a primary crusher;
    b) mixing the output material of the crusher with fluid to form a viscous slurry material in a slurry mixing tank;
    c) transferring said slurry to a first hydrocyclone;
    d) passing the fluids extracted from the first hydrocyclone to the slurry tank;
    e) passing the solids removed from said hydrocyclone to a primary shaker for classification;
    f) passing the oversize material from the primary shaker to a secondary crusher;
    e) passing the output of the secondary crusher back to the slurry mixing tank for further processing;
    f) passing the undersized material to a first holding tank;
    g) passing the material from the first holding tank to a second hydrocyclone;
    h) removing the liquids produced from the second hydrocyclone and passing them to a second holding tank;
    g) removing the solids from the second hydrocyclone and passing them through a secondary shaker;
    h) transferring the liquids from the second holding tank into a final processing tank;
    i) passing the undersized material from the secondary shaker to the final processing tank;

j) passing the oversize material from the secondary shaker through a tertiary crusher;

k) passing the material from the tertiary crusher into the second holding tank for further processing; and l) passing the slurry material from the final processing tank into a well injection system for injection into a disposal well.

14. The method of claim 13 wherein the step of passing the slurry material from the final processing tank into a well injection system for injection into a disposal well comprises the steps of:

a) passing the slurry material into an injection tank;

b) passing the slurry material from said injection tank under pressure to an injection pump manifold;

c) forcing said slurry mixture through an injection pump;

d) forcing said mixture into an injection well.

15. The process of claim 13 wherein the step of mixing the output material of the crusher with fluid to form a viscous slurry material further comprises:

a) forcing a portion of the slurry mixture held in the second holding tank back into slurry mixing tank to promote additional mixing.

16. The process of claim 13 wherein said slurry mixture is forced by means of pumps.

17. The process of claim 13 further comprising the step of:

a) injecting heat in said slurry mixing tank to promote thawing of frozen material.

18. The process of claim 13 wherein said viscous slurry held in said slurry mixing tank is pumped from said tank by means of a DISCFLO type pump.

* * * * *